United States Patent [19]

Ishida et al.

[11] Patent Number: 4,542,975
[45] Date of Patent: Sep. 24, 1985

[54] CAMERA FLASH LIGHT CONTROL CIRCUITRY

[75] Inventors: Tokuji Ishida; Hiroshi Hosomizu, both of Osaka, Japan

[73] Assignee: Minolta Camera Kabushiki Kaisha, Osaka, Japan

[21] Appl. No.: 580,351

[22] Filed: Feb. 15, 1984

Related U.S. Application Data

[62] Division of Ser. No. 428,581, Sep. 30, 1982, , which is a division of Ser. No. 257,238, Apr. 24, 1981, Pat. No. 4,367,023.

[30] Foreign Application Priority Data

Apr. 25, 1980 [JP] Japan .................................. 55-55740
Apr. 25, 1980 [JP] Japan .................................. 55-55741

[51] Int. Cl.$^4$ ............................................. G03B 15/05
[52] U.S. Cl. ..................................... 354/416; 354/418
[58] Field of Search ................ 354/415, 416, 417, 418

[56] References Cited

U.S. PATENT DOCUMENTS

| | | | |
|---|---|---|---|
| 4,016,575 | 4/1977 | Uchiyama et al. | |
| 4,311,371 | 1/1982 | Kobori et al. | |
| 4,349,260 | 9/1982 | Ishida et al. | 354/415 |
| 4,351,594 | 9/1982 | Ishida et al. | 354/415 |
| 4,436,396 | 3/1984 | Maida | 354/416 |
| 4,449,802 | 5/1984 | Nakamura | 354/416 |
| 4,477,171 | 10/1984 | Yamada | 354/416 |

FOREIGN PATENT DOCUMENTS 54-104332  8/1979  Japan .

OTHER PUBLICATIONS

A Schematic Circuit Diagram of Minolta's Auto Electro Flash 118X, 132X, 200X and 300X Products sold in the United States.

Primary Examiner—Russell E. Adams
Attorney, Agent, or Firm—Watson Cole Grindle & Watson

[57] ABSTRACT

In a flash photography system including an electronic flash device adapted to be combined with a camera which is adapted to transmit first and second signals to an electronic flash device and to receive third and fourth signals therefrom, and wherein the third signal informs the camera of the completed preparation for flash light emission; the first signal directs the electronic flash device to initiate flash light emission; the fourth signal directs the camera to initiate light measurement upon flash light emission; and the second signal directs the electronic flash device to terminate flash light emission in accordance with the light measurement. The electronic flash device incorporates a flash light emitting device, storage of electric power for operation of the flash light emitting device, a circuit for generating the third signal with the stored electric power exceeding a predetermined level, first, second and third terminals connected to the camera for respectively receiving the first signal, transmitting the third signal, and receiving the second signal; circuitry for initiating flash light emission in response to the first signal; circuitry for providing the fourth signal in response to the first signal; and circuitry for terminating flash light emission in response to the second signal. The circuitry is capable of modifying the third signal into the fourth signal in response to the first signal and changing the third signal into different voltages depending upon the electric power stored; and modifying the third voltage into the fourth signal if the stored power exceeds a predetermined level. Circuitry enables the third signal to connect with the second terminal in the absence of the first signal and to transmit to the second terminal the fourth signal in place of the third signal in response to the first signal.

9 Claims, 4 Drawing Figures

CAMERA FLASH LIGHT CONTROL CIRCUITRY

This application is a Divisional application of application Ser. No. 428,581, filed Sept. 30, 1982, which in turn is a Divisional application of Ser. No. 257,238, filed Apr. 24, 1981, now U.S. Pat. No. 4,367,023.

BACKGROUND OF THE INVENTION

1. Field of the Invention

The present invention relates to a camera adapted to receive a flash device for flash photography, and more particularly to such camera apparatus having an automatic diaphragm control device operable for flash photography.

2. Description of the Prior Art

In co-pending U.S. Patent Application Ser. No. 56,938, filed on July 12, 1979, assigned to the same Assignee as the present application, there is disclosed a camera capable of being combined with a dedicated flash device which is designed to produce a preliminary flash of a relatively long duration at a substantially constant intensity prior to the production of a primary flash to be used in actual photography. The preliminary flash is produced for the purpose of providing an object with that illumination necessary for automatic diaphragm determination. The camera comprises a diaphragm aperture changeable from an initial aperture size during the duration of the preliminary flash light, means for receiving light through the diaphragm aperture during the duration of the preliminary flash to generate a first signal responsive to the intensity of the received light, and means for interrupting the change in the aperture size of the diaphragm aperture in response to the first signal to determine the aperture size.

The preliminary flash light is generally designed to be durable for a predetermined period of time sufficiently greater than the maximum time period necessary for the diaphragm aperture to be stopped-down from the fully open aperture size to the minimum aperture size thereof, e.g., 25 msec, for the purpose of determining the diaphragm aperture at any size in the changeable range thereof.

However, if the stopping-down motion of the diaphragm aperture is to be interrupted before the diaphragm is actually stopped-down to its minimum aperture size, i.e., if the diaphragm is determined at a relatively greater aperture size than the minimum aperture size such as in the case of relatively close object distance, the time necessary for the diaphragm aperture to be determined is reduced. This means that the diaphragm aperture is determined, in such a case, at a relatively early stage of the predetermined duration period of the preliminary flash light and the light energy continued to be emitted after the determination of the aperture size is an unnecessary waste.

SUMMARY OF THE INVENTION

An object of the present invention is to provide an improved camera capable of being combined with a dedicated flash device to enable optimum diaphragm aperture setting during a controllable preliminary flash light emission.

Another object of the present invention is to eliminate the above-mentioned loss of energy in automatic diaphragm control mode of operation with flash photography.

A further object of the invention is to provide automatic diaphragm aperture control during a controlled interval of substantially constant preliminary flash light emission.

Another object of the invention is to optimize a photographic exposure with a camera adapted to mount exchangeable lenses having different minimum apertures, and in particular to automatically optimize the diaphragm aperture setting during an optimized controlled preliminary flash light emission interval.

Yet a further object of the invention is to provide an indication that a dedicated flash device capable of producing controlled preliminary flash light emission is attached to the camera.

And yet still a further object of the invention is to provide camera circuitry adapted to function with a dedicated flash device to provide normal exposure time control and optimum flash control with automatic cut-off of voltage booster circuitry for charging a flash tube energization capacitor in the dedicated flash device.

Another object of the invention is to provide improved camera exposure control circuitry for controlling the termination of preliminary and primary flash light emission from a dedicated flash device adapted to operate with the camera exposure control circuitry.

Still a further object of the invention is to provide a more versatile camera control circuitry enabling a number of different camera exposure control modes of operation such as exposure-time preferred automatic exposure; aperture-preferred automatic exposure; programmed automatic exposure, in which both the exposure time and aperture size are automatically controlled according to the brightness of an object; flash exposure providing automatic determination of the diaphragm aperture and with automatically controlled exposure time according to flash-synchronized time; and a manual exposure in which both exposure time and aperture size are manually selected.

And yet a further object of the invention is to provide optimum photographic exposure and in particular flash exposure by automatically adjusting the diaphragm aperture during an automatically controlled preliminary flash emission, followed by automatically controlled exposure in accordance with the measurement of light reflected from an object.

According to the present invention, the improvement comprises an additional means for transmitting a second signal to the dedicated flash device in response to the determination of the aperture size for terminating the duration of the preliminary flash light.

BRIEF DESCRIPTION OF THE DRAWINGS

The above objects, features and advantages of the invention are apparent to one of ordinary skill in the art of photographic cameras from the following description of preferred embodiments representing the best mode of carrying out the claimed invention when taken in conjunction with the following drawings, wherein:

DETAILED DESCRIPTION OF THE PREFERRED EMBODIMENTS

In the following description the terminals designated as T47 and T'47 correspond to "first terminals" as used in the claims. Terminals T45 and T'45 correspond to "second terminals" are used in the claims. Terminals T46 and T'46 correspond to "third terminals" as used in the appended claims.

Figure 1:
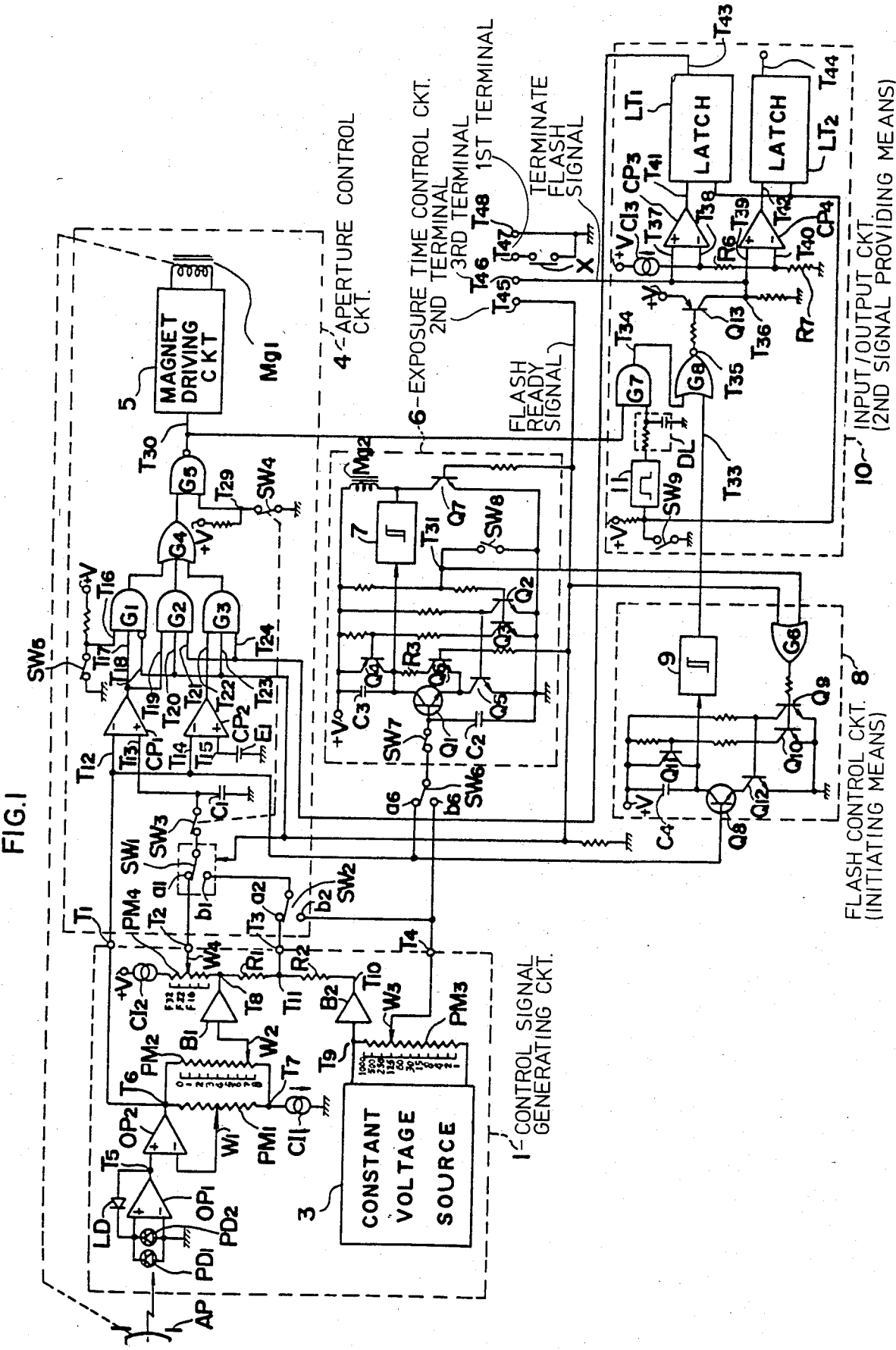
FIG. 1 represents a preferred embodiment of a camera exposure circuit schematic according to the present invention.

FIG. 1 shows a preferred embodiment of an exposure control circuit adapted to be incorporated into a single lens reflex camera. As a matter of introduction, the camera including this circuit preferably has five exposure control modes, namely, an exposure-time-preferred automatic exposure mode by which the diaphragm aperture size is automatically controlled to provide correct exposure for a manually set exposure time; an aperture-preferred automatic exposure mode by which the exposure time is automatically controlled according to a preset aperture size; a programmed automatic exposure mode by which both exposure time and aperture size are automatically controlled according to the brightness of an object; a flash photography mode by which the diaphragm aperture is automatically set at an aperture size suitable for photographing with a flash device and with the exposure time automatically controlled according to flash-synchronized time; and a manual mode by which both exposure time and aperture size are manually selected. The automatic aperture size control mode is carried out by a well-known structure wherein the diaphragm aperture stopping-down operation is discontinued to determine the aperture size when the intensity of the object light measured through the diaphragm during the stopping-down operation thereof reaches a given value.

Figure 2:
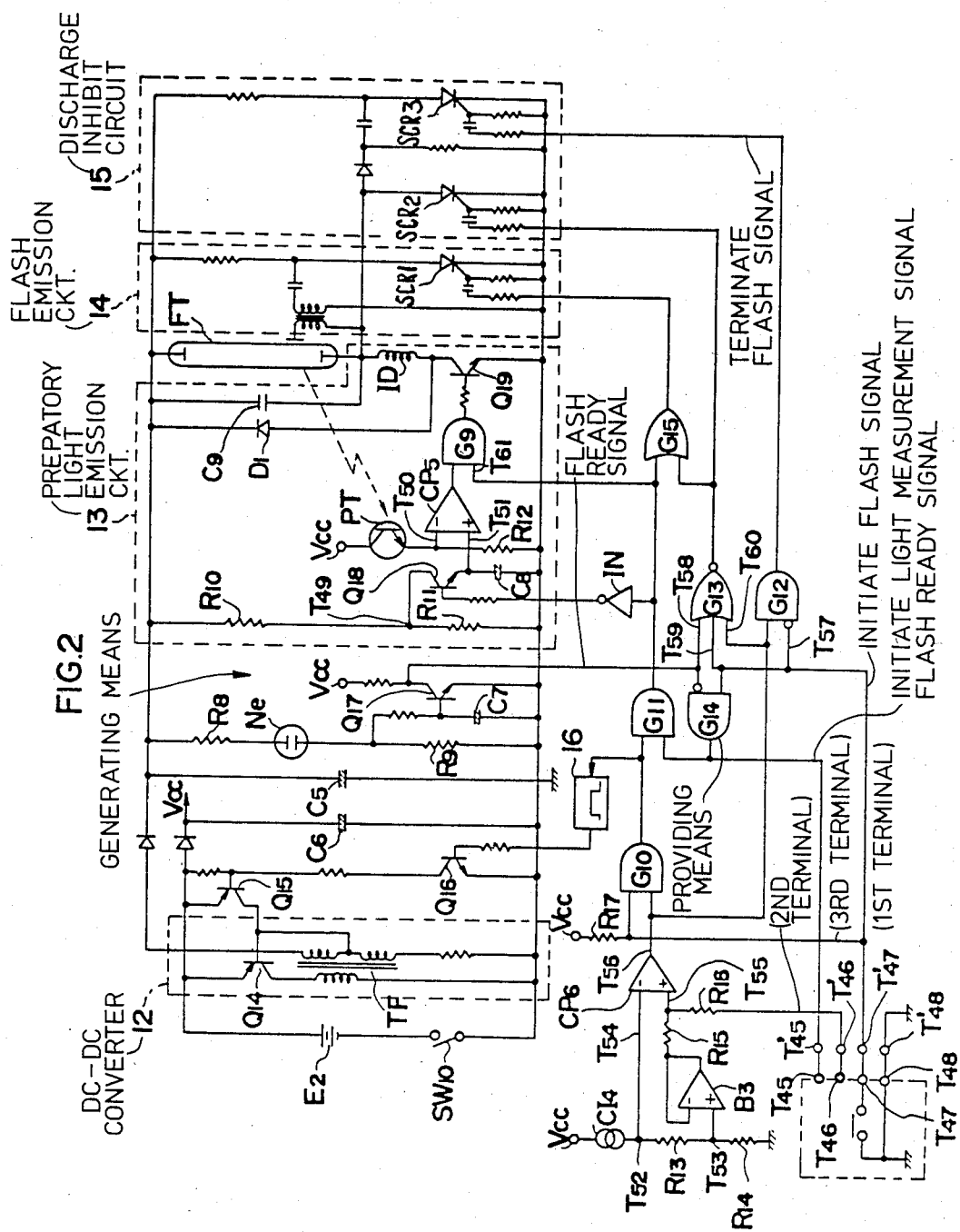
FIG. 2 represents a circuit diagram of a preferred exemplary embodiment of the dedicated flash device to be combined with the FIG. 1 embodiment of the present invention.

Exposure control in the flash mode is performed by using the flash device as depicted in FIG. 2. In the flash photography mode, light is emitted from the flash device to illuminate the object while the diaphragm is being stopped-down from the fully open aperture size to the minimum aperture size thereof in association with the depression of the shutter release button. The intensity of light reflected on the object and passing through the diaphragm aperture is measured during such illumination interval by the flash device circuitry. When the results of these measurements reach a desirable value, the stopping-down motion is interrupted to determine the aperture size and light emission from the flash device is discontinued. After the aperture size has been properly determined, the shutter is opened and the flash device is triggered to emit light again. When this occurs, reflected light from an exposed film surface, for example, is measured and integrated. When the integrated amount of the measured light intensity reaches a predetermined value, then the flash device discontinues to emit light. The first emission of light in the flash mode of the flash device for aperture size determination is referred to as "preparatory light emission" and the second light emission for exposure is referred to as "primary light emission" hereinafter.

With reference to FIG. 1, control signal generating circuit 1 is adapted to develop four control signals, as described below, for the purpose of controlling aperture size and exposure time. The first control signal is a voltage signal which depends on the intensity of the object light passing through objective lens L and aperture AP and the film speed, and is output from terminal T1. The second control signal is a voltage signal which appears at terminal T2 with a fully open aperture in dependence on the film speed and a value which is obtainable by converting the intensity of the object light measured through the fully open aperture into that passing through a predetermined another aperture size, for example, F 8. The third control signal appears at terminal T3 with a fully open aperture and has the characteristic that the ratio of variation in the third control signal to the variation in the object light intensity is less than that for the first control signal. The fourth control signal is a voltage signal which corresponds to a manually set exposure time regardless of the object light intensity and is output from terminal T4.

Figure 3:
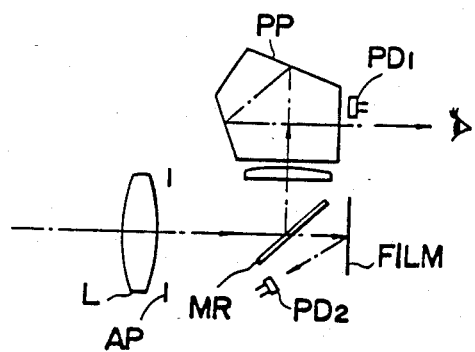
FIG. 3 represents a cross-sectional diagrammatic view of a pertinent portion of the light measuring device incorporated in the FIG. 1 embodiment.

Control signal generating circuit 1 for generating the above mentioned four signals is constructed in the following manner. Operational amplifier OP1, two photodiodes PD1 and PD2, and logarithmic conversion diode LD form a photometer circuit. A voltage which is proportional to the logarithm of the intensity of light incident on photodiode PD1 or PD2 is output from output terminal T5 of operational amplifier OP1. As shown in FIG. 3, one of the two photodiodes (e.g., PD1) is disposed in the vicinity of an eye piece behind pentagonal prism PP, whereas the other photodiode (e.g., PD2) is disposed in a position, for example, the bottom of a mirror box, to receive the object light reflected from the film surface with a mirror MR in the up position. Therefore, with mirror MR in the down position, the object light is received by photodiode PD1, whereas the same light is received by photodiode PD2 during the exposure of the film with the mirror MR in the retracted position.

Operational amplifier OP2, potentiometers PM1 and PM2 and constant current source CI1 form an exposure information calculating circuit. Slider W1 of potentiometer PM1 is operatively interlocked with a film speed setting dial (not shown) in a well-known manner and is positioned in accordance with the film speed setting. Output terminal T6 of the operational amplifier OP2 delivers a signal obtained by the calculation of the output signal from the photometer circuit with the information indicative of the film speed, that is, the first control signal. Slider W2 of the other potentiometer PW2 is interlocked in a well-known manner with an aperture preset means provided in a lens barrel (not shown) and is positioned at a point spaced away from the terminal T6 towards terminal T7 in correspondence with steps representing the difference between the aperture value for the fully open aperture and that for the preset aperture. For example, if the fully open aperture value is F 1.4 and the preset aperture value is F 16, slider W2 is moved by seven steps of voltage from the voltage at terminal T6 toward that of terminal T7. Each one of the seven steps of voltage mentioned above corresponds to a step of variation in the output voltage appearing at terminal T5 caused by the conditions when the intensity of light incident on photodiode PD1 or PD2 is doubled or halved. Therefore, when the aperture size of the objective lens is fully open, there is developed from slider W2 a voltage signal dependent upon the object light intensity, the film speed and the preset aperture size. This signal is characteristic of a correct exposure time in the aperture-preferred automatic exposure mode. The voltage appearing at slider W2 is supplied to terminal T8 via buffer amplifier B1.

Constant voltage source 3, combined with potentiometer PM3, forms an exposure time signal generating circuit which generates an exposure time signal according to the manually set exposure time. There appears at terminal T9 of potentiometer PM3 a signal corresponding to the highest shutter speed or shortest exposure time of the camera, e.g., 1/1000 sec. This signal is amplified via buffer amplifier B2 to become signal T10. There are also generated from respective points along potentiometer PM3 signals corresponding to respective exposure times, with a desired one of the signals being selected by slider W3. A pair of resistors R1 and R2 are serially connected between terminal T8 and signal output T10 and a voltage signal having a level intermediate the voltage levels appearing at terminal T8 and signal output T10 is developed from junction T11 to appear at terminal T3. This third output signal is used for controlling exposure in the programmed automatic exposure mode. It is noted that in the above illustrated camera the minimum aperture size is used for the programmed automatic exposure mode and the flash photography mode.

Constant current source CI2 and potentiometer PM4 form a level shift circuit. Slider W4 is located at a particular position corresponding to the minimum aperture size of the exchangeable lens actually attached to the camera. For example, where three kinds of different aperture values for the minimum aperature size, i.e., F 16, F 22 or F 32, are expected in various exchangeable lenses, slider W4 is designed to be selectively placed in any one of three positions to develop a voltage increased by two, three or four steps from the potential at terminal T8 depending on the aperture value F 16, F 22 or F 32, respectively. To automatically achieve such voltage shifting, an element is provided on the lens side to transmit information of the minimum aperture size to the camera body and a receiving element is provided on the camera body to receive the minimum aperture information. Such lens and camera structure are disclosed in U.S. Pat. No. 4,118,726, for example.

After the position of slider W4 has been determined in the above manner, there appears at terminal T2 a signal indicative of the correct exposure time for aperture value F 8 regardless of the minimum aperture size of the individual lens attached to the camera, when the preset aperture is identical with the minimum aperture size and aperture AP is in fact in the fully open state. For example, where a lens with a minimum aperture size of F 16 is employed, the signal from terminal T8, with the preset aperture identical with the minimum aperture size, indicates the correct exposure time for the aperture of F 16 so that there is developed at terminal T2 a voltage shifted by two steps from that at terminal T8, that is, a signal indicative of the correct exposure time for the aperture F 8. Also, although some voltage signals can appear at terminals T2 and T3 even when the aperture has been actually stopped-down, these signals are of no use.

Aperture control circuit 4 operates principally in the following manner in response to the depression of the camera release button (not shown). Immediately before the diaphragm aperture is actually stopped-down from the fully open position thereof, switch SW3 is opened to permit memory capacitor C1 to store the voltage signal appearing at terminal T3 for the program mode of operation, for example. Comparator CP1 compares this stored voltage with the voltage appearing at terminal T1 during the stopping-down motion and, if both voltages are in a specific relationship to one another, including being equal, for example, energizes electromagnet Mg1 to interrupt the stopping-down motion of aperture AP.

Continuing with the structure and operation of the circuit of FIG. 1, switch SW1 is normally connected to contact b1 and switched to contact a1 only for the flash mode. Switch SW1 comprises an analog switch using transistors and is adapted to switch to contact a1 automatically in response to a flash ready signal from the flash device via terminal T45. Second switch SW2 has contacts a2 and b2 selectable in accordance with the operator's exposure mode selection, with contact a2 connected during the programmed automatic exposure mode and contact b2 connected during the exposure-time-preferred automatic exposure mode. First memory switch SW3 and switch SW4 are synchronously opened immediately before the beginning of the stopping-down motion, thus storing a voltage by capacitor C1 which has been supplied via switch SW1. First comparator CP1 determines whether the voltage level of the first control signal is higher or lower than the stored voltage of memory capacitor C1 and, when the voltage level of this signal is lower than the stored voltage, representing a reference level, generates a "high" level (or a logic value "1"). The output terminal of comparator CP1 is connected to one of the inputs to each of AND gates G1 and G2.

AND gate G1 transfers the output signal of comparator CP1 to OR gate G4 during the exposure-time-preferred mode or the program mode. In other words, when either the exposure-time-preferred mode or the program mode is selected, switch SW5 is in the open position to supply a "1" signal to another of the input terminals of AND gate G1. The remaining input terminal T18 of AND gate G1 is a NOT input terminal to which the "1" signal is supplied to place AND gate G1 into a blocked condition. Input terminal T18 is connected to the flash device via external terminal T45 and, with the signal "1" present, corresponding to the flash ready signal from the flash device indicating that the main capacitor is charged and ready to emit light, blocks AND gate G1 and prevents the output signal "1" of comparator CP1 from passing therethrough.

A pair of AND gates G2 and G3 is used during the flash mode and each AND gate has two input terminals respectively connected to external terminal T45 and an output terminal of latch LT1 of input/output circuit 10 described hereinafter. As is apparent from the following description, the output of latch LT1 is set at a "1" level when the flash device is in use. Therefore, AND gates G2 and G3 are capable of respectively transmitting the output signals of comparators CP1 and CP2 only when the flash device is used and is developing the flash ready signal.

Comparator CP2 operates in the following manner. Assuming that the flash device with a guide number of 32 is used, the operable distance of the flash device with an F 8 aperture is four m. Accordingly, in this condition, proper illumination is ensured when the flash device fully emits light. In other words, the maximum limit of the object distance whereby correct exposure is ensured during the flash mode is four m. However, the method for controlling the diaphragm aperture size using the comparator CP1 results in controlling the aperture size to F 8 even for an object outside the operable distance, for example, at a distance of six m.

If the fully open aperture of the lens is F 1.4, then the operable distance of the flash device is about twenty-two m. Therefore, if an aperture size in the possible range of F 8 to F 1.4 is set for an object at a distance of about four m to twenty-two m where the flash device is not operable with an aperture of F 8, correct exposure is given. Comparator CP2 is useful in achieving this sort of aperture control. A voltage V1 developed from a constant voltage source E1 connected to input terminal T15 of comparator CP2 is determined as follows. Suppose that the aperture size of the camera is generally controlled at F 8 where the maximum guide number of the flash device is 32 for a film speed of ASA 100 and the camera is in the flash mode. And further suppose that the preparatory light emission takes place when an object with a standard reflectance (say, 18%) is located at the operation distance limit of four m for aperture F 8. Voltage V1 of constant voltage source E1 is selected to be equal to a voltage which corresponds to the voltage appearing at terminal T6 when reflected light from the object being illuminated with the preparatory light emission passes through aperture AP set to F 8 in the above supposed condition. According to the above design, if the voltage level at terminal T1 becomes lower than the selected voltage V1 before the aperture size is stopped-down to F 8 during the stopping-down motion of the aperture AP in the flash mode with the preparatory light emission, then the output of comparator CP2 changes from a "low" level to a "high" level, thus energizing the electromagnet Mg1 and discontinuing the stopping-down motion to achieve an aperture size greater than that of F 8.

The output terminals of AND gates G1, G2 and G3 are connected to an input terminal of OR gate G4, the output of which is connected to an input terminal of NAND gate G5. Switch SW4, connected to input terminal T29 of NAND gate G5 is placed into the open position in synchronism with the opening of memory switch SW3. In other words, before the stopping-down motion is initiated upon actuation of the camera release mechanism, the output of NAND gate G5 is held at a "1" level notwithstanding the output of OR gate G4. Electromagnet drive circuit 5 energizes and de-energizes electromagnet Mg1 when the level of input terminal T30 thereto is "1" and "0", respectively. When electromagnet Mg1 is de-energized, an interrupting member is forced into the operating position to inhibit the stopping-down motion of aperture AP.

The following is a description of exposure time control circuit 6. Switch SW6 is turned to contact b6 during manual mode and otherwise turned to contact side a6. After the aperture determination has been completed and immediately before mirror MR is flipped up, switch SW7 is opened to permit second memory capacitor C2 to store the intensity of the object light measured through the already determined diaphragm aperture. There is also provided antilogarithmic conversion transistor Q1, integration capacitor C3 charged by the collector current of transistor Q1, and switching circuit 7, the output of which is inverted to deenergize electromagnet Mg2 when integration capacitor C3 is charged to a desired voltage level. Switch SW8 is closed at the beginning of exposure, for example at the initiation of the travel of the leading curtain of a two-curtain type focal plane shutter, to provide a timing signal for the beginning of the exposure time counting operation. When switch SW8 is closed, transistor switches Q2, Q3 and Q4 are turned off and transistor Q5 is turned on so that integration capacitor C3 starts being charged with the collector current of transistor Q1. With switch SW8 in the open position, transistors Q2, Q3 and Q4 are conductive and transistor Q5 is non-conductive so that capacitor C3 is short-circuited and not charged.

The bases of transistors Q6 and Q7 are connected to external terminal T45 to be positively biased by the flash ready signal from the flash device. Transistors Q6 and Q7 serve to create flash-synchronized exposure time in exposure time control circuit 6 when the flash ready signal is supplied from the flash device. In other words, when the flash ready signal is generated and transistor Q5 is switched on upon the depression of the release button, integration capacitor C3 is further charged with current from transistor Q6 and resistor R3. The resistance of resistor R3 is such that integration capacitor C3 is charged to the desired voltage level due to the current flowing through resistor R3 before synchro switch X is closed. Accordingly, the switching circuit 7 has been in a condition to de-energize electromagnet Mg2 before synchro switch X is closed. However, because transistor Q7 is conductive at this moment, electromagnet Mg2 continues to be energized through transistor Q7. When the shutter is fully open and synchro switch X is closed to trigger a flash tube associated with the flash device, the flash ready signal disappears as described hereafter so that transistor Q7 is turned off to de-energize the electromagnet Mg2 and bring the shutter into the closed position. The above procedure is carried out to control the flash-synchronized exposure time.

Flash control circuit initiating means 8 is adapted to develop a signal to discontinue light emission when the quantity of light from the flash device amounts to a level sufficient to provide correct exposure. Flash control circuit 8 is similar to exposure time control circuit 6 and includes antilogarithmic conversion transistor Q8, current integration capacitor C4 and switching circuit 9 whose output is switched from a "0" level to a "1" level when capacitor C4 is charged to a desired voltage level. When the output of OR gate G6 assumes a "0" level, switching transistors Q9, Q10 and Q11 are turned off and transistor Q12 is turned on, thus starting charging the current integration capacitor C4 with the collector current of transistor Q8. Two input terminals of OR gate G6 are connected to terminal T31 of switch SW8 and external terminal T45, respectively, and the output of OR gate G6 is inverted from a "1" level to a "0" level when switch SW8 is closed and the flash ready signal from the flash device disappears in response to the closing of synchro switch X. In other words, the current integration capacitor C4 begins integrating in synchronism with the closing of synchro switch X.

The reason why two means for integrating quantity of light are provided is as follows. The brightness of an object illuminated with flash light is higher than that illuminated with daylight particularly when the object is at a short distance in the order of one to two m. Antilogarithmic conversion transistor Q1 is adapted to operate within the range of the brightness of the object illuminated with natural daylight and thus fails to exhibit good antilogarithmic conversion properties for a brightness exceeding the upper limit of the range of the brightness of the object illuminated with natural daylight to a great extent. To this end, second antilogarithmic conversion transistor Q8 is provided to accommodate the range of the brightness of the object illuminated with flash light. Furthermore, the reason why integration operation by current integration capacitor C4 is started in synchronism with the closing of synchro switch X rather than at the beginning of exposure is to prevent capacitor C4 from being charged with collector leak current through transistor Q8, etc., before the closing of synchro switch X.

Input/output circuit 10 (second signal providing means) is adapted to trigger the preparatory light emission from the flash device via an external terminal T46 and send a control signal to the flash device for controlling the period of the preparatory light emission. Input/output circuit 10 receives from the flash device a voltage signal indicating whether a dedicated flash device such as shown in FIG. 2 (called first flash device hereafter) or another flash device of a different kind (called second flash device hereafter) is in use. For example, the second flash device is one which does not function to provide preparatory light emission as does the first flash device. Switch SW9 in the input/output circuit 10 is the first to close upon depression of the shutter release button. Before switch SW9 is closed, a photometer circuit and a display circuit (not shown) for determining correct exposure time for the object and other desired circuits are supplied with power from a battery or batteries through a power switch (not shown) which is closed upon first depressing or contacting the shutter button. Where the illustrated embodiment is used in a camera of the electromagnet release type, switch SW9 may be used as a release switch.

One-shot circuit 11 generates a "1" voltage for a limited period of time typically thirty msec in response to the closing of switch SW9. The interval of this voltage signal extends over a time period necessary for the diaphragm aperture to be stopped-down from the fully open size to the minimum aperture size.

AND gate G7 receives the respective outputs of one-shot circuit 11 and NAND gate G5. NOR gate G8 receives the outputs of AND gate G7 and switching circuit 9 and has output T35 connected via a resistor to the base of PNP transistor Q13. Transistor Q13 is turned on when the output of NOR gate G8 is at "0" level. NOR gate G8 provides the "0" output when at least one of its inputs is supplied with a "1" signal. This occurs when gate G5 provides the "1" output after switch SW9 is closed, that is, during the stopping-down motion, or alternatively, when switching circuit 9 provides a "1" output, that is, after the quantity of light from the flash device reaches that level to provide correct exposure in the flash mode. Having been turned on, the collector of transistor Q13 provides "1" voltage level. It is thus obvious that the "1" signal appears at external terminal T46 while the aperture is being stopped-down, or when the flash device discontinues primary light emission. A constant current source CI3 and resistors R6 and R7 form a constant voltage source for supplying constant voltages of different levels to input terminals T38 and T40 of comparators CP3 and CP4, respectively. The constant current source CI3, resistors R6 and R7, comparators CP3 and CP4 and latch circuits LT1 and LT2 determine the voltage signal supplied from the flash device through external output terminal T46 and also hold the results of such determination in latches LT1 and LT2. This operation is accomplished by latching latch circuits LT1 and LT2 upon the closing of switch SW9. The voltage levels at terminals T38 and T40 are designated VT38 and VT40, respectively. If the voltage level VF1 from the first flash device is VF1>VT38 and the voltage level VF2 from the second flash device is correlated as VT38>VF2>VT40, then the outputs of the latches LT1 and LT2 are "1" and "1" for the first flash device and "0" and "1" for the second flash device. In the case of a general-purpose flash device with no terminals to be connected to the external terminals T45 and T46, the outputs of the latches LT1 and LT2 are always "0". Those skilled in the art will recognize that the outputs of the latches LT1 and LT2 in the unlatched state can be provided to a display circuit (not shown) for displaying the type of flash device in use.

The following is a description of a circuit arrangement in the flash device. Referring to FIG. 2 showing the first flash device, power source batteries are designated E2 and a power switch is designated SW10. DC-DC converter 12 is of a well-known structure including an oscillation transistor Q14 and an oscillation transformer TF. Main capacitor C5 stores energy sufficient for preparatory light emission and primary light emission. Transistor Q15 is turned on to short the base-to-emitter path of transistor Q14 and inhibit the operation of DC-DC converter 12 when transistor Q16 is turned on. Capacitor C6 is provided to supply a smoothed DC voltage to a low voltage circuit about the time of light emission by flash tube FT.

The constant resistances of resistors R8 and R9 are selected such that neon tube Ne is fired when main capacitor C5 is charged with sufficient energy for flash light emission. When neon tube Ne is fired, transistor Q17 is turned on to provide a "0" collector voltage level. Capacitor C7 holds transistor Q17 in the on state shortly before neon tube Ne is turned off. These components constitute means for generating a flash ready signal as indicated in FIG. 2.

Preparatory light emission circuit 13 is adapted to enable flash tube FT to emit light with a constant intensity for a given period of time, typically 30 msec.

A combination of resistors R10 and R11, transistor Q18 and capacitor C8 in this circuit permits capacitor C8 to hold a voltage corresponding to the charged voltage of main capacitor C5 at the moment when transistor Q18 is turned off, and supplies the voltage on capacitor C8 as a reference voltage to one input of comparator CP5, thus forming a reference voltage circuit. Photo transistor PT receives the light output of flash tube FT passing through a specific path without being affected by reflectance from the object, and the object distance. Resistor R12 develops a voltage proportional to the photo current through photo transistor PT. Comparator CP5 provides a "0" output and a "1" output when the voltage developed across resistor R12 is higher and lower than the charged voltage of capacitor C8, respectively. The output of comparator CP5 is fed to the base of transistor Q19 via gate G9. The collector of transistor Q19 is connected to one end of inductor ID, the other end of which is input to one end of flash tube FT. Capacitor C9 is connected in parallel with flash tube FT and diode D1 is connected in parallel with a series circuit of flash tube FT and inductor ID.

The above described preparatory light emission control circuit operates in the following manner. Assume that main capacitor C5 has been sufficiently charged. Further, assuming that transistor Q18 is conductive, capacitor C8 is charged substantially with the voltage appearing at junction T49 between resistors R10 and R11. Then, the voltage on capacitor C8 remains unchanged when transistor Q18 is turned off as described below. When flash tube FT is not fired, comparator CP5 provides a "1" output because the voltage level at input terminal T51 is higher than that at terminal T50. Under these circumstances the "1" signal is supplied to input terminal T61 of AND gate G9, thus triggering flash tube FT as discussed below. Since AND gate G9 initially provides a "1" output, transistor Q19 is turned on. Upon the triggering of flash tube FT the charge on main capacitor C5 is discharged through flash tube FT, inductor ID and transistor Q19. This permits flash tube FT to emit light with a gradually increasing intensity upon the passage of time. With such increase in the intensity of light emission, the voltage level at input terminal T50 increases and, when that voltage level exceeds the voltage level at input terminal T51 permits comparator CP5 to provide a "0" output to turn off the transistor Q19. Transistor Q19 in the shut-off state prevents the charge on main capacitor C5 from being discharged. However, flash tube FT does not stop emitting light immediately but does provide an increase in the intensity of light emission (due to the properties of the flash tube) shortly after the output of comparator CP5 has changed from the "1" level to the "0" level, and finally provides a decline in light intensity. When transistor Q19 is shut off, energy stored on inductor ID in the form of a magnetic field is converted into current and supplied to flash tube FT via diode D1. Additionally, the charge on capacitor C9 is also supplied to flash tube FT. Provided that the voltage level at input terminal T50 becomes lower than that at input terminal T51 (according to the decline in the intensity of the light emission from flash tube FT after shut-off of transistor Q19), comparator CP5 provides a "1" output again to turn on transistor Q19. Thereafter, the intensity of light emission increases and the above operation is repeated. The interval of on-off switching of transistor Q19 in the above light emission control operation may be selected to be less than 1 msec and less than the intensity of light emission from an AC-energized lamp. The above light emission control operation continues until AND gate G9 is closed or the stored energy of main capacitor 5 is consumed to the extent that it becomes impossible to control light emission.

In the foregoing description, the voltage on capacitor C8, used as the reference voltage, is selected to be proportional to the charged voltage on main capacitor C5 before the flash device emits light. Provided that the charged voltage on capacitor C8 is higher than that of capacitor C5, comparator CP5 will perform a switching operation within a higher intensity region with a resulting increase in light intensity. In other words, the higher the initial charged voltage of main capacitor C5, the higher the light intensity emission. The reason why the intensity of the preparatory light emission is dependent on the charged voltage of main capacitor C5 will be more clearly understood from the following description.

A well-known flash tube trigger circuit is provided which triggers flash tube FT when thyristor SCR1 becomes conductive. Discharge inhibit circuit 15 is also well known and inhibits flash tube FT from discharging. In the process of providing primary light emission, flash tube FT is triggered and thyristor SCR2, included in discharge inhibit circuit 15, is made conductive, thus permitting the charge on main capacitor C5 to be discharged through thyristor SCR2. If thyristor SCR3 becomes conductive in the course of discharging capacitor C5, then thyristor SCR2 is biased at its anode with a negative potential and cut-off.

Transistors Q16, Q17 and Q18, AND gate G9, thyristors SCR1, SCR2 and SCR3 and the control circuitry associated therewith are controlled in the following manner. Constant current source CI4 and resistors R13 and R14 form a constant voltage generating circuit. A constant voltage at the node T53 is supplied to input terminal T55 of comparator CP6 via buffer amplifier B3 and resistor R15, and then to the circuitry on the camera via resistor R16 and external output terminal T46. A constant voltage at node T52 is supplied to another input terminal T54 of comparator CP6. Unless a voltage is supplied via terminal T'46 from a separate voltage source, comparator CP6 provides a "0" output since the voltage level at negative input terminal T54 is higher than that at positive input terminal T55. Output terminal T56 of comparator CP6 is connected to one input terminal of each of AND gates G10 and G12 and NOR gate G13, respectively. It is noted that respective ones of external terminals T'45, T'46, T'47 and T'48 are to be connected to counterpart terminals T45, T46, T47 and T48, respectively, on the camera. In order that the voltage level at external terminal T'47 is "1" when the synchro switch on the camera is in the open position, external terminal T'47 is connected to a low voltage source Vcc through resistor R17 and to one of the input terminals of AND gates G10, G12, AND gate G14 and NOR gate G13. The other input terminal T57 of AND gate G12 is a NOT input. One-shot circuit 16 develops a "1" voltage for a limited period of time, for example 0.1 sec., in response to inversion of the output of AND gate G10 from a "0" level to a "1" level, thus turning on transistors Q16 and Q15. While transistor Q15 is conductive, voltage booster 12 is inhibited from operating.

AND gate G14, (providing means) having a NOT input terminal connected to the collector of transistor Q17, provides a "1" output when synchro switch X on the camera is open and transistor Q17 is conductive. This "1" signal is supplied as the flash ready signal to the circuitry in the camera. Upon closing synchro switch X, AND gate G14 is blocked and provides a "0" output. In the condition where main capacitor C5 is completely charged, transistor Q17 is turned on and the output of comparator CP6 is at the "0" level, NOR gate G13 receives all "0" signals at the three input terminals T58, T59 and T60 and develops a "1" output. This "1" signal is used as a trigger signal to gate thyristors SCR1 and SCR2 conductive. Thyristors SCR1 and SCR2 when conductive initiate primary light emission. When synchro switch X is in the closed position and primary light emission takes place, comparator CP6 provides a "1" output in response to the "1" input supplied via external terminal T'45 on the camera. This "1" output is fed via AND gate G12 to the gate of thyristor SCR3, thus gating thyristor SCR3 conductive. In this manner, primary light emission is terminated.

A camera combined with the above described flash device operates in the following manner. Assume that an objective lens with a fully open aperture size of F 1.4 and a minimum aperture size of F 16 is attached to the camera and the minimum aperture size of F 16 is preset. When power switch SW10 is switched on and main capacitor C5 is completely charged within the flash device of FIG. 2, switch SW1 is turned to contact a1 in response to the flash ready signal from the flash device, thereby setting the camera into the flash mode. It is assumed under these circumstances that the shutter button is lightly depressed to supply the camera circuit with the enabling voltages. Because switch SW9 is in the open position before the shutter is released, the output of one-shot circuit 11 assumes a "0" level and the output of AND gate G7 also assumes a "0" level. The output of switching circuit 9 is also at the "0" level. The output of NOR gate G8 is therefore at a "1" level and transistor Q13 is cut-off. When this occurs, the voltage level at junction T36 is equal to voltage VF1 provided by the flash device. As stated previously, voltage VF1 is held in the relationship VF1>VT38 with the voltage VT38 appearing at negative input terminal T38 of comparator CP3. The outputs of both comparators CP3 and CP4 are therefore "1".

Then, after the shutter button is further depressed and the shutter release command is delivered to close switch SW9, latches LT1 and LT2 are latched to hold the outputs thereof at the "1" level as seen from the following Time Table.

TIME TABLE

Shutter Release
- SW9 ON, & Initiation of Preparatory Firing
- SW3 & SW4 OFF
- Initiation of Aperture Stopping Down Motion

- Interruption of Aperture Stopping-Down Motion, & Termination of Preparatory Firing
- SW7 OFF
- Mirror Flipping UP

- Initiation of Travel of Leading Shutter Curtain
- Initiaion of Exposure, & SW8 ON

- Shutter Fully Open, X ON, Triggering of Primary Firing, & Initiation of Travel of Trailing Shutter Curtain

- Closure of Shutter, & Termination of Exposure

In response to the closing of switch SW9 one-shot circuit 11 develops a "1" pulse output which, in turn, is delayed by delay circuit DL and supplied to gate G7. Transistor Q13 is thereby turned on by the resulting "0" output of NOR gate G8, thus bringing terminal T36 and external output terminal T46 up to the "1" level. This "1" signal is then applied to input terminal T55 of comparator CP6 of the flash device, which comparator provides a "1" output to permit the output of AND gate G10 to assume a "1" level. This gate output triggers one-shot circuit 16 and inhibits DC-DC converter 12 from further operating for a brief period of time. The "1" output of AND gate G10 is gated through AND gate G11 and to the input of inverter IN to an input of AND gate G9 and the gate of SCR1. This results in cutting-off transistor Q18 and unblocking gate G9. Thyristor SCR1 is also turned on to fire flash tube FT. Then, it is time for initiation of preparatory light emission in response to switch SW9 being closed.

At the beginning of preparatory light emission, switches SW3 and SW4 are opened so that the intensity of the object illuminated with the preparatory light emission and measured to appear as second control signal at terminal T2 is stored by memory capacitor C1. After switches SW3 and SW4 have been opened, aperture AP is stopped-down step-by-step. When the measured intensity level becomes lower than reference voltage E1 before aperture AP is stopped-down to F 8, comparator CP2 develops a "1" output prior to comparator CP1. At the moment when the "1" output of comparator CP2 is developed, the output of AND gate G5 is inverted to a "0" level, thus de-energizing electromagnetic Mg1 and interrupting the stopping-down motion of aperture AP to determine the aperture size. Simultaneously, AND gate G7 is blocked to shut off transistor Q13 and the signal transmitted to the flash device through the external terminal T46 is switched from a "1" to a "0". As a consequence, the output of comparator CP6 of the flash device is lowered to a "0" level to block AND gate G9 and turn off transistor Q19, thus discontinuing preparatory light emission.

However, should the first control signal output at terminal T1 be lower than the stored voltage of capacitor C1 prior to being lower than reference voltage E1, the output of comparator CP1 assumes a "1" level and aperture AP is brought to a setting of F 8. In a manner similar to that mentioned above, the duration of the preparatory light emission is discontinued simultaneously with the determination of the aperture size.

In the case where the aperture is preset at F 4 and is not stopped-down to a smaller size with no tendency for comparators CP1 and CP2 to invert their outputs to the "1" level, the preparatory light emission takes place for the predetermined period of time when one-shot circuit 11 develops an output.

Once the aperture size has been determined in the above manner, switch SW7 is opened and the intensity of the object light measured and appearing as the first control signal at terminal T1 through the thus determined aperture size is stored by memory capacitor C2 under the condition that switch SW6 is switched to contact a6. It is noted that the stored signal of second memory capacitor C2 is not used during the flash mode.

After the opening of switch SW7, mirror MR is flipped-up and the shutter is opened. Concurrently with the opening of the shutter, switch SW8 is closed so that transistor Q4 is cut-off and transistor Q5 is turned on. Because the base of transistor Q6 is forwardly biased by the flash ready signal from the flash device, transistor Q5 becomes conductive so that integration capacitor C3 is immediately charged with current flowing through transistor Q6 and switching circuit 7 provides a "1" output before the shutter is fully open. However, because transistor Q7 remains conductive, the shutter has not been closed yet. As soon as the shutter is fully open synchro switch X is closed to invert the voltage level at external output terminal T'47 of the flash device from a "1" level to a "0" level. In reply to such inversion, the output of NOR gate G13 assumes a "1" level and the output of AND gate G14 assumes a "0" level. The output of AND gate G12 remains at the "0" level under these circumstances. With the output of NOR gate G13 inverting to the "1" level, both thyristors SCR1 and SCR2 are triggered. The residual charge on main capacitor C5 is discharged via the series connection of flash tube FT and thyristor SCR2 to permit primary light emission. At this time the "0" output of AND gate G14 (providing means) turns off transistor Q7 in the camera and de-energizes electromagnet Mg2, thus starting closing of the shutter. But, if the voltage level at external output terminal T45 is lowered to the "0" level in response to synchro switch X being closed, the output of OR gate G6 assumes a "0" level to render transistor Q8 conductive. In other words, in synchronism with the closing of synchro switch X, integration capacitor C4 begins integrating the collector current of transistor Q8 which is proportional to the measured light intensity appearing as the first control signal at terminal T1. When integration capacitor C4 is charged to the desired voltage level, the output of switching circuit 9 is changed from a "0" to a "1" level. When this occurs, the output of AND gate G8 assumes a "0" level to make transistor Q13 conductive again. The result is that the flash device is supplied with a "1" signal from external output terminal T46 and the output of comparator CP6 is increased to a "1" level again. Because under these circumstances synchro switch X is in the closed position and terminal T47 is held at a "0" level, a "1" output of comparator CP6 is transferred via AND gate G12 to the gate of thyristor SCR3. As is well known, flash tube FT is extinguished because thyristor SCR3 is turned on.

There is no interference from the shutter closing member during the above discussed operation, while the shutter begins closing in response to the closing of synchro switch X and at the same time the quantity of light is integrated for the purpose of controlling light emission from the flash tube. In other words, while the primary light emission lasts for less than 2 msec, it takes a longer time for the shutter closing member to begin screening the actually exposed film after electromagnetic Mg2 has been de-energized. This ensures exposure of the film by the flash light reflected from the object.

As noted earlier, when the flash device provides the flash ready signal, the camera is automatically switched to the flash mode upon release of the shutter. In the event that insufficient exposure is expected with a particular aperture size, e.g., F 8, the aperture is automatically adjusted to a greater size and the quantity of light from the flash tube is also automatically controlled.

The charged voltage on main capacitor C5 in the flash device during the flash mode is different even after the delivery of the flash ready signal, depending on various conditions: for example, immediately after the ready signal has been delivered, after a considerable amount of time has expired, or when battery E2 is rarely used. Therefore, the whole quantity of flash light differs depending on which of these aforementioned conditions prevail. The term "whole quantity of flash light" used herein means the whole quantity of light emitted from flash tube 7 when main capacitor C5 is discharged constantly without any interruption. Assuming that the guide number of the flash device is 32 when main capacitor C5 is fully charged, the object distance is 4 m with an aperture size of F 8. As stated previously, the voltage V1 in the constant voltage source E1 on the camera side is determined in correspondence with the voltage indicative of the intensity of the object light measured through the diaphragm aperture of F 8 when the standard object is illuminated with preparatory light emission at a distance of 4 m. There is of course insufficient exposure where the aperture size is controlled at F 8 for the standard object located at a distance of 4 m even though main capacitor C5 is insufficiently charged. In this case the aperture should be wider. Within the circuitry of the flash device the intensity of the preparatory light emission varies according to the charged voltage of main capacitor C5 and decreases with a decrease in the charged voltage because of the dependency of the voltage stored on capacitor C8 with the charged voltage of main capacitor C5. Consequently, since the intensity of reflected light due to the preparatory light emission with a low charged voltage is lower than that in the case of a fully charged voltage, the measured voltage at terminal T1 agrees with the voltage V1 of constant voltage source E1 with respect to the standard object at a distance of 4 m before aperture AP is stopped-down to F 8. In this manner, the size of the diaphragm aperture is determined at a value greater than that corresponding to F 8, thus automatically compensating for variations in the charged voltage of main capacitor C5.

It is noted that energy consumption for preparatory light emission is lower than that for primary light emission and the intensity of preparatory light emission is preferably selected to be about 1/5 that of primary light emission. The foregoing description has set forth the operation of the camera and the flash device of FIG. 2 when both components are combined together.

The following is a description of the operation of a camera combined with the second flash device which does not provide the function of preparatory light emission but functions to discontinue emitting light in response to a light emission inhibit signal supplied via external output terminal T46 of the camera. The second flash device differs from the first flash device shown in FIG. 2 as follows. Preparatory light emission circuit 13 is eliminated, the gate of thyristor SCR1 is connected to the output of NOR gate G13 and constant voltage VF2 appearing at terminal T53 leading to the input of buffer amplifier B3 is maintained in the relationship of VT38>VF2>VT40 with respect to the constant voltages VT38 and VT40 appearing at terminals T38 and T40, respectively, in the camera circuit.

It is assumed that the flash device is ready to emit light. When switch SW9 in the camera circuit is closed upon release of the shutter, the outputs of latch circuits LT1 and LT2 are held at the "0" and "1" levels, respectively. AND gate G2 is therefore blocked in response to the "0" output signal of latch circuit LT1, while AND gate G1 is blocked in response to the flash ready signal supplied via external input terminal T45. Because AND gates G1, G2 and G3 are all closed, the above described aperture control operation is not carried out and consequently the diaphragm aperture is set at the preset value or the manually set value. Although a "1" signal appears at terminal T46 during the stopping-down motion of aperture AP, the flash device does not respond to this signal. If synchro switch X is closed with the shutter in the fully open position, then the light quantity and flash-synchronized exposure time are automatically controlled for the flash device in the same manner as in the circuit of FIG. 2.

The operation of the camera and the flash device during the flash mode having been described and illustrated, the following description sets forth the operation of the camera during the flash exposure mode.

Assume now that switches SW2 and SW6 are turned to contacts a2 and a6, respectively, the switch SW6 is opened and the program mode is selected. The switching of these switches is accomplished by actuating a mode selector lever (not shown).

Assume that, for example, a lens with a fully open aperture size of F 1.4 is used and the aperture preset means is preset at a minimum aperture size of F 16. Furthermore, it is assumed that a signal indicative of 1/2000 sec. appears at terminal T1 and a signal indicative of 1/15 sec. appears at slider W2 when the aperture size is fully open for the object. Since a signal indicative of 1/1000 sec appears at terminal T9, a signal indicative of 1/125 sec., intermediate 1/15 sec. and 1/1000 sec. appears at terminal T3 as long as the resistances of resistors R1 and R2 are equal to each other. When the shutter is released under these circumstances, first memory capacitor C1 stores the voltage signal appearing at terminal T3 immediately before the beginning of the stopping-down motion of aperture AP. With aperture AP fully open, comparator CP1 receives the voltage signals indicative of 1/2000 sec. and 1/125 sec. at input terminals T12 and T13, respectively, and thus provides a "0" output.

The voltage level at input terminal T12 of comparator CP 1 decreases gradually during the stopping-down motion of aperture AP. If this voltage level is substantially equal to the voltage level at input terminal T13, then the output of comparator CP1 is switched to a "1" level and the output of NAND gate G5 is inverted from a "1" level to a "0" level, thus energizing electromagnet Mg1 and interrupting the aperture stopping-down motion. The result is that aperture AP is stopped-down by four steps with respect to the fully open size and is thus set at F 4. After the aperture size has been determined, the intensity of the object light measured through the aperture is stored by second memory capacitor C2 in exposure time control circuit 6. Then, the shutter is opened subsequent to the flip-up of mirror MR and the exposure time is controlled based on the value stored by second memory capacitor C2.

It is obvious to those skilled in the art that switch SW7 and second memory capacitor C2 may be eliminated and the base of transistor Q1 supplied with the voltage signal appearing at terminal T1 during exposure. In this case, it is necessary that the camera have a focal plane shutter and the reflection properties of the leading curtain be substantially the same as that of the film.

The operation of the circuitry during the exposure-time-preferred mode is carried out in the same manner as that during the program mode, except that the signal at terminal T4 is used instead of the signal at terminal T8.

In the program mode, the exposure time is automatically controlled similar to that during the aperture preferred mode, but is based on the measured value at terminal T1 after the aperture has been stopped-down to the aperture setting.

Figure 4:
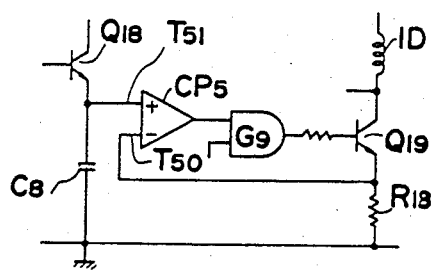
FIG. 4 represents a circuit diagram of a pertinent portion of a modification of the circuit embodiment of FIG. 2.

FIG. 4 shows a modification of the preparatory light emission control circuit in FIG. 2, wherein resistor R18 is connected between the emitter of transistor Q19 and ground instead of the series circuit of phototransistor PT and resistor R12. A voltage appearing across resistor R18 is supplied to input terminal T50 of comparator CP5. Input terminal T50 of comparator CP5 is supplied with a voltage proportional to the current flowing through flash tube FT during preparatory light emission in the circuit of FIG. 4, whereas in the circuit of FIG. 2 the same input terminal is supplied with a voltage proportional to the photo current flowing through photo transistor PT upon receipt of light from flash discharge tube FT. The same control operation as in the circuit of FIG. 2 is available in the circuit of FIG. 4 since the light intensity of the flash discharge tube is substantially proportional to the current flowing therethrough.

It is, therefore, desired that the present invention not be limited to the embodiments specifically described, but that it include all such modifications and variations that would be obvious to those skilled in this art. The scope of our invention should be determined by the equivalents of the various terms as recited in the following annexed claims.

Resistors R8 and R9, neon tube NE, capacitor C7, transistor Q17 and voltage source VCC in FIG. 2 constitute the "generating means" in the appended claims to provide the flash ready signal.

NOR gate G13, OR gate G15 and thyristors SCR1 and SCR2 of FIG. 2 constitute the "initiating means" in the appended claims.

Comparator CP6, AND gate G12 and thyristor SCR3 of FIG. 2 constitute the "terminating means" in the appended claims.

What is claimed is:

1. In a flash photography system including an electronic flash device adapted to be combined with a camera adapted to transmit first and second signals to an electronic flash device and to receive third and fourth signals therefrom, said third signal informing the camera of the completed preparation for flash light emission, said first signal directing said electronic flash device to initiate flash light emission, said fourth signal directing the camera to initiate light measurement upon flash light emission, and said second signal directing said electronic flash device to terminate flash light emission in accordance with said light measurement, said electronic flash device comprising:

means for emitting flash light;
means for storing electric power for operation of said means for emitting flash light;
means for generating said third signal with the stored electric power exceeding a predetermined level;
a first terminal connectable to the camera for receiving said first signal;
means connected to said first terminal for initiating flash light emission by said flash light emitting means in response to said first signal;
means responsive to the receipt of said first signal at said first terminal for providing the fourth signal;
a second terminal connectable to the camera for transmitting said third signal upon generation thereof by said generating means, and for transmitting said fourth signal in response to the provision thereof by said means for providing;
a third terminal connectable to the camera for receiving said second signal; and
means connected to said third terminal for terminating flash light emission in response to said second signal.

2. The electronic flash device as claimed in claim 1, wherein said means for providing modifies said third signal into said fourth signal in response to the receipt of said first signal at said first terminal.

3. The electronic flash device as claimed in claim 2, wherein said generating means includes means for changing said third signal between a first voltage greater than a given voltage with said electric power exceeding said predetermined level and a second voltage less than said given voltage with said electric power not exceeding said predetermined level, and wherein said providing means lowers said third signal into said fourth signal below the given voltage in response to the receipt of said first signal at said first terminal even if the stored electric power exceeds said predetermined level.

4. The electronic flash device as claimed in claim 1, wherein said means for providing includes an output connected to said second terminal, a first input connected to said generating means and a second input connected to said first terminal, for allowing the third signal to connect with said second terminal as generated by said generating means in the absence of said first signal at said first terminal, and for forwarding said fourth signal in place of said third signal toward said second terminal when said first signal is received at said first terminal.

5. The electronic flash device as claimed in claim 4, wherein said providing means controls a signal at said output to change from a low level to a high level when said third signal is generated in the absence of said first signal at said first terminal and to return from said high level to said low level when said first signal is received at said first terminal, wherein the change in said output from low to high level represents the connection of the third signal with said second terminal, and the return of the output from high to low level represents the providing of the fourth signal.

6. The electronic flash device as claimed in claim 1, wherein said terminating means includes a switching element connected in series with said emitting means to said storing means, and means for switching said switching element nonconductive in response to said second signal.

7. In a flash photograhy system including a camera adapted to be combined with an electronic flash device adapted to receive first and second signals from the camera and to transmit third and fourth signals thereto, said third signal informing the camera of the completed preparation for flash light emission, said first signal directing said electronic flash device to initiate flash light emission, said fourth signal directing the camera to initiate light measurement upon flash light emission, and said second signal directing said electronic flash device to terminate flash light emission in accordance with said light measurement, said camera comprising:

a first terminal connectable to said electronic flash device for transmitting said first signal;
means connected to said first terminal for generating said first signal at a predetermined flash-synchronized time;
a second terminal connectable to said electronic flash device for receiving said third and fourth signals;
means connected to said second terminal for controlling the camera to prepare for flash photography in response to said third signal;
means connected to said second terminal for initiating light measurement in response to said fourth signal;
a third terminal connectable to said electronic flash device for transmitting said second signal; and
means connected to said third terminal for providing said second signal in accordance with said light measurement.

8. The camera as claimed in claim 7, wherein said controlling means includes means for detecting a first voltage at said second terminal greater than a given voltage before the generation of said first signal to control the camera to prepare for flash photography in response to the detection of said first voltage, and wherein said initiating means includes means for arresting a change in the voltage at said second terminal from a first voltage to a second voltage less than said given voltage after the generation of said first signal to initiate said light measurement in response to said arresting of said voltage change, the first voltage detected before the generation of said first signal corresponding to said third signal, and the change from said first voltage to said second voltage after the generation of said first signal corresponding to said fourth signal.

9. The camera as claimed in claim 8 further comprising means for receiving light to generate an electric current, and means for integrating said electric current, wherein said initiating means includes means for starting the integrating operation of said integrating means in response to said fourth signal, and wherein said providing means includes means for determining that said integration is at a predetermined level to provide said second signal.

* * * * *